Figure 8:
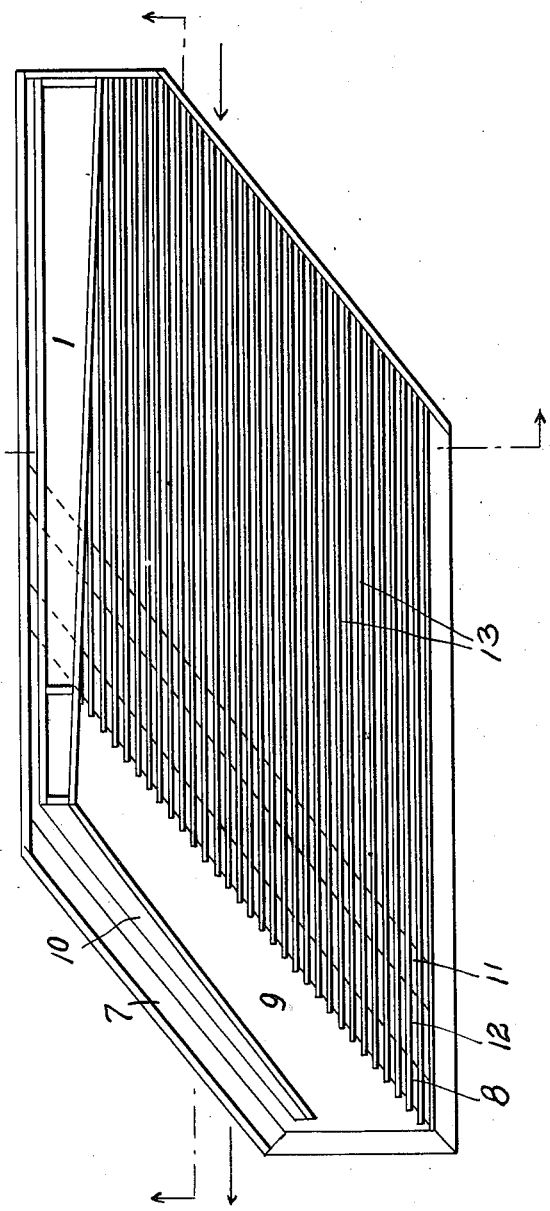

E. DEISTER.
CONCENTRATING TABLE.
APPLICATION FILED JUNE 26, 1916.
1,211,364.
Patented Jan. 2, 1917.
7 SHEETS—SHEET 1.
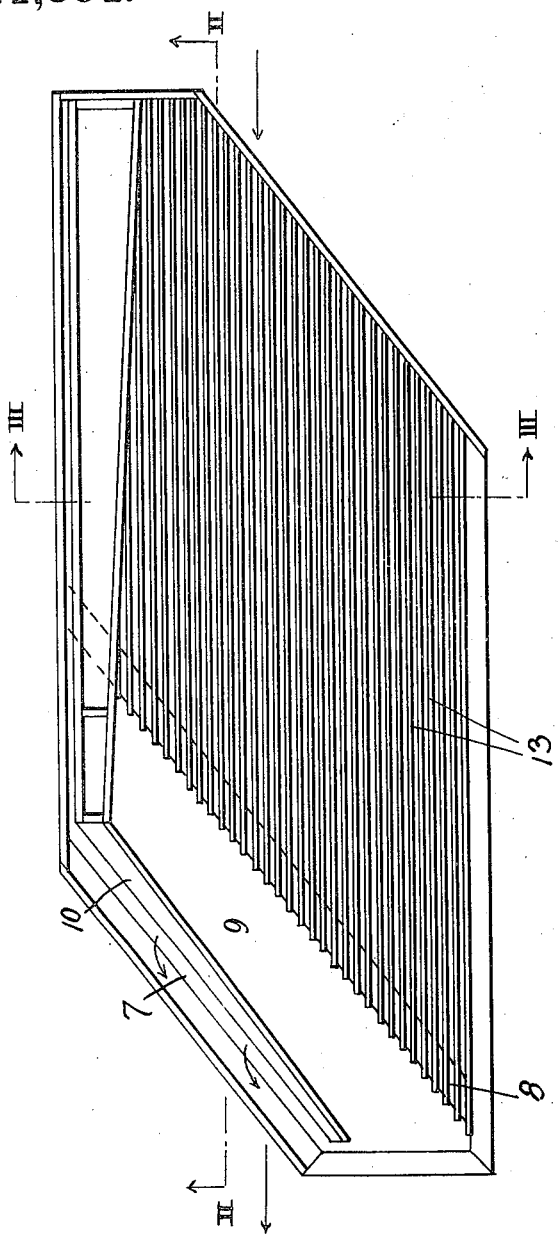
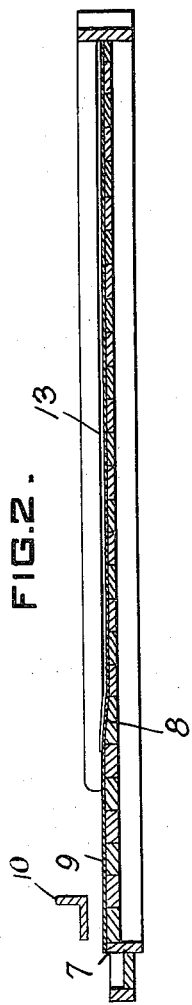
WITNESSES:
J. Herbert Bradley
INVENTOR
Emil Deister
BY
Darwin S. Wolcott
ATTORNEY

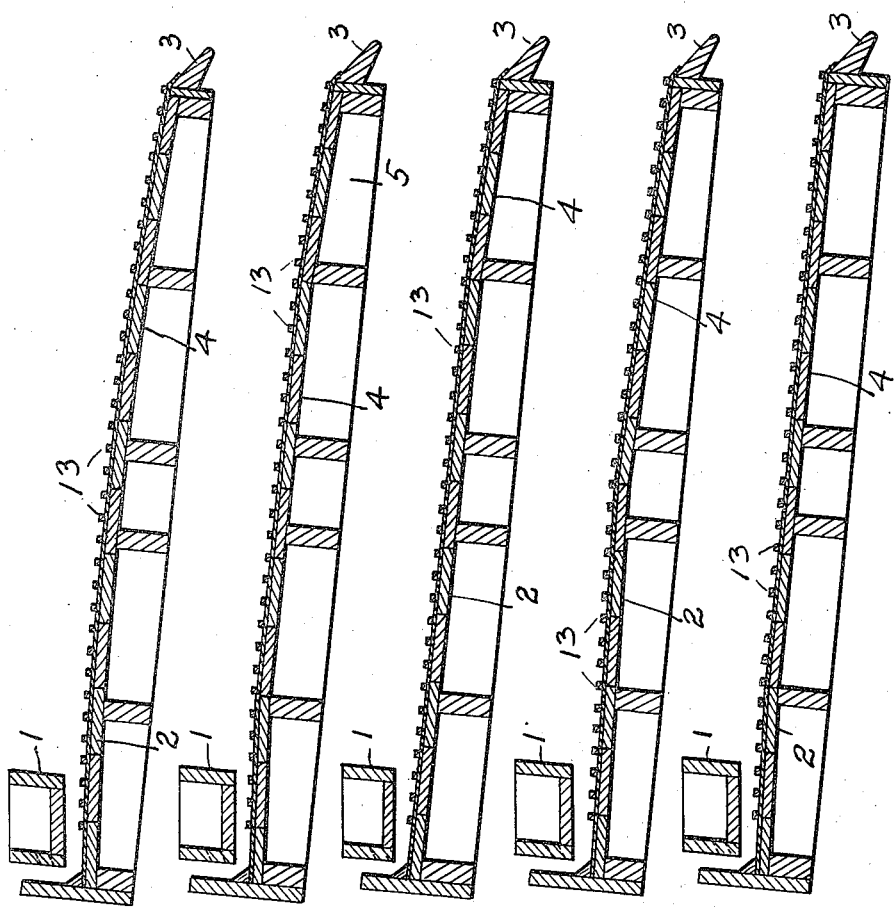

E. DEISTER.
CONCENTRATING TABLE.
APPLICATION FILED JUNE 26, 1916.

1,211,364.

Patented Jan. 2, 1917.
7 SHEETS—SHEET 3.

WITNESSES:
J. Herbert Bradley.

INVENTOR

BY
ATTORNEY

E. DEISTER.
CONCENTRATING TABLE.
APPLICATION FILED JUNE 26, 1916.
1,211,364.
Patented Jan. 2, 1917.
7 SHEETS—SHEET 4.
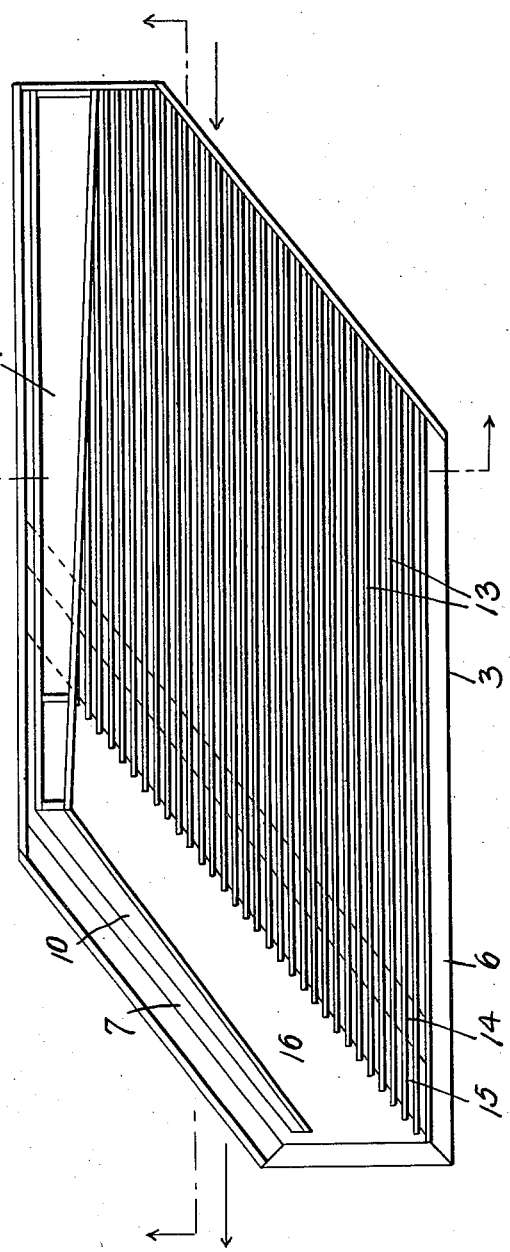
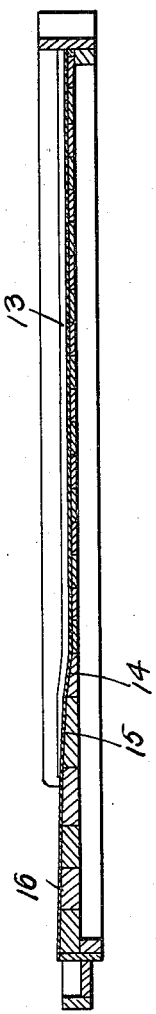
WITNESSES:
INVENTOR
BY
ATTORNEY

E. DEISTER.
CONCENTRATING TABLE.
APPLICATION FILED JUNE 26, 1916.

1,211,364.

Patented Jan. 2, 1917.
7 SHEETS—SHEET 5.

WITNESSES:
J. Herbert Bradley.

INVENTOR
Emil Deister
BY
Dennis S. Wolcott
ATTORNEY

E. DEISTER.
CONCENTRATING TABLE.
APPLICATION FILED JUNE 26, 1916.

1,211,364.

Patented Jan. 2, 1917.
7 SHEETS—SHEET 6.

WITNESSES:
J. Herbert Bradley.

INVENTOR
Emil Deister
BY
Darwin S. Wolcott
ATTORNEY

E. DEISTER.
CONCENTRATING TABLE.
APPLICATION FILED JUNE 26, 1916.
1,211,364.
Patented Jan. 2, 1917.
7 SHEETS—SHEET 7.
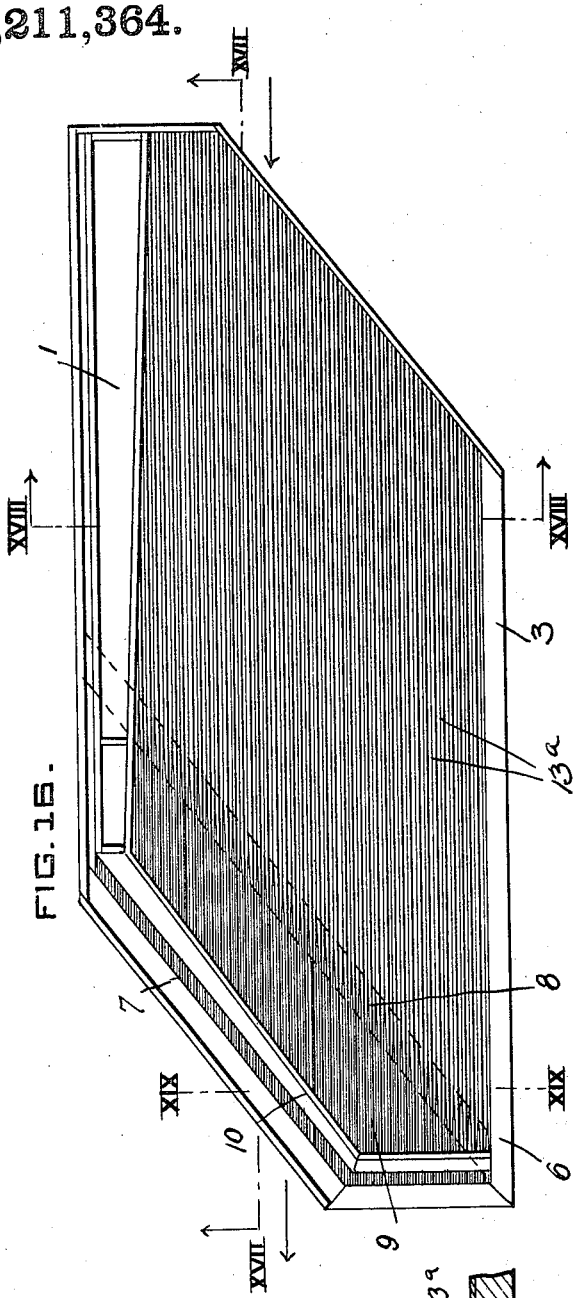
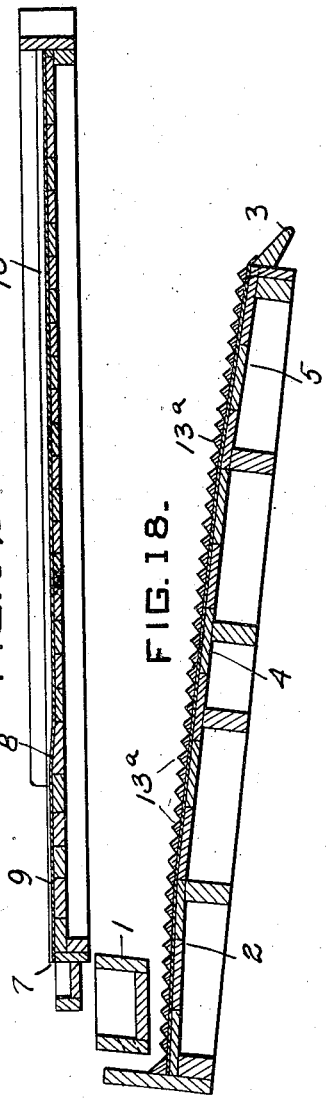
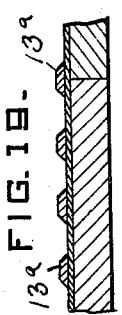
WITNESSES:
INVENTOR
Emil Deister
BY
Darwin S. Wolcott
ATTORNEY

UNITED STATES PATENT OFFICE.

EMIL DEISTER, OF FORT WAYNE, INDIANA, ASSIGNOR TO DEISTER MACHINE COMPANY, OF FORT WAYNE, INDIANA, A CORPORATION OF INDIANA.

CONCENTRATING-TABLE.

1,211,364.　　　　　Specification of Letters Patent.　　Patented Jan. 2, 1917.

Application filed June 26, 1916.　Serial No. 105,839.

*To all whom it may concern:*

Be it known that I, EMIL DEISTER, residing at Fort Wayne, in the county of Allen and State of Indiana, a citizen of the United States, have invented or discovered certain new and useful Improvements in Concentrating-Tables, of which improvement the following is a specification.

The invention described herein relates to certain improvement in concentrating tables and has for its object a construction whereby the rate of flow of the material to be treated from the line of feed to the tailing discharge edge will be approximately inversely proportional to the percentage of the values contained in the material, the rate of flow being increased as the values move down out of the material flowing across the top of the riffles.

The invention is hereinafter more fully described and claimed.

In the accompanying drawing forming a part of this specification, Figure 1 is a top plan view of a concentrating table embodying the improvements described and claimed herein; Fig. 2 is a sectional view on a plane indicated by the line II—II, Fig. 1; Fig. 3 is a sectional view on a plane indicated by the line III—III, Fig. 1. Figs. 4, 5, 6 and 7 are views similar to Fig. 3 showing certain modifications of the improvement; Figs. 8, 10, 12, 14 and 16 are top plan views of tables embodying modifications of the construction shown in Fig. 1, and Figs. 9, 11, 13, 15 and 17 are sectional views of the tables shown in Figs. 8, 10, 12, 14 and 16 respectively, the planes of section being parallel with the direction of movement of the table; Figs. 18 and 19 are transverse sections on planes indicated by the lines XVIII—XVIII and XIX—XIX, Fig. 16, Fig. 19 being an enlarged scale.

In the practice of the invention, the table is formed with a plurality of stratifying surfaces, or surfaces on which the values will settle down through the gangue. The first surface, *i. e.*, the surface onto which the pulp is directed by the feed box 1 is so inclined downwardly from the line of feed that the rate of flow of the material will be relatively slow and hence there will be slight agitation of the material and a large percentage of the values will settle down through the gangue onto the surface. The extent of this portion in the direction of flow will depend upon the richness of the ore and the character of the minerals. The second surface has a greater downward inclination than the first and consequently the rate of flow of the material will be increased. This increased flow will not materially retard the settling down of the values remaining in suspension as the latter, while the material is passing over the first surface, will have moved so far down through the stream that the subsidence of a large percentage below the tops of the riffles will not be prevented by the more rapid movement of the stream. This second inclined surface may extend to the tailings discharge edge or, if preferred, one or more additional surfaces each having a greater downward inclination than the preceding surface, may be used.

As is well known, the differential vibrations of the table will cause not only the values but also the sand, although in a lesser degree, to move toward the mineral discharge edge. As the sand overlies the minerals or values, it will be affected by the more rapid flow of the material, and hence a smaller percentage will remain sufficiently long on the table to be discharged at the middling discharge edge.

Thus the provision of means whereby nearly all of the values will settle down onto the table adjacent to the line of feed, will insure the discharge of a very large percentage along the upper portion of the mineral discharge edge, and reduce the percentage passing over the middling discharge edge to a very low percentage, and the increased rate of movement of the material as the values are eliminated, will reduce the percentage of sand discharge at or adjacent to the middling discharge edge to a minimum.

As shown in Fig. 3, the improvement may be embodied in a table by constructing it with its surface curved transversely of the direction of the vibration of the table, the curvature being such that by proper adjustment, the rate of flow across the portion 2, along the upper edge of which the pulp is directed by the feed trough 1, may be slow. In lieu of a curved surface as shown in Fig. 3, the table may consist of a plurality of flat planes or surfaces arranged at an angle the one to the other as shown in Figs. 4, 5, 6 and 7, the breaks due to angular relation of adjacent portions being parellel or substantially parallel with the direction of movements of the table. For operation, the table is so adjusted that the portion 2, onto which the pulp is fed will be nearly horizontal, so that the flow of pulp over it toward the tailing discharge edge 3 will be at such a rate that a greater portion of the values will settle down onto the portion 2. It has been found that by the time the material has flowed across the portion 2, a very large proportion of the values have settled down onto, or into close proximity to the surface of the portion 2, and the material reaching the line of break consists very largely of gangue, which should be removed from the path of the oncoming material. This removal is effected by giving the portion 4 of the table such a downward inclination, that the material will have a more rapid movement toward the tailings discharge edge. The downward inclination of the portion 4 should not be so great as to cause a rate of flow so rapid that there will not be an efficient gravity separation of values remaining in the material, while it is flowing across the portion 4. The portion 4 of the table may extend from the portion 2 to the tailings discharge edge 3, with uniform inclination, as shown in Figs. 5, 6, and 7, but it has been found that by giving a portion 5 of the table adjacent to the discharge edge, a downward inclination greater than that of the portion 4, as shown in Fig. 4, there will be a substantial reduction in the proportion of gangue discharged over the middlings discharge edge 6. By reason of the more rapid flow of the material across the portion 5, such material will be subjected for a shorter time to the vibrating motion of the table and hence a very small proportion of the gangue will reach the middling discharge edge 6. The extent of the portion 2 from the line of feed toward the tailing discharge edge may be varied and will be dependent upon the character of the material to be treated.

In the construction shown in Figs. 4 and 6, the portion 2 forms approximately one third of the main stratifying surface, while Fig. 6 shows the portion extending about half way, and in Fig. 5 it is shown extending about two thirds of the width of the table.

The flow of material from the line of feed to the tailings discharge is comparatively slow at first, but is increased as the values are separated out by gravity and hence the material moved along the portion 4 toward the mineral discharge edge, by the vibration of the table will carry with it a comparatively small amount of gangue.

The retention of the material fed onto the table for such a length of time as will permit of a large proportion of the values settling down onto the surface of the table, also affords opportunity for the movement of a large part of the material, both values and gangue, toward the mineral discharge edge. While the values will move at a higher rate than the gangue, a large proportion of the latter will necessarily partake of the same movement, and hence a large amount of washing water would be required to prevent gangue from passing over the mineral discharge were it not for the interposition of means for effecting a separation of the values and gangue, such means being adapted to permit the continued onward movement of the values to the mineral discharge edge, and to divert the gangue toward the tailings discharge edge. In effecting this separation of the values and gangue, it is preferred to employ means for causing the values to move upwardly out of the gangue and onto a surface free from gangue, except such fine particles as may adhere to the particles of mineral. Means of this character are shown in Figs. 1 and 2 and consist of an inclined surface 8 arranged transversely of the line of movement of the values toward the mineral discharge edge and preferably at an acute angle to such line of movement, and a plateau extending from the top of the incline to the mineral discharge edge 7. The plateau is made of such a height above the main or stratifying surface of the table, that its surface will be level or slightly above the surface of the material on the stratifying portion of the table. While the minerals are moving up the incline they will be crowded together, but as soon as the minerals pass into the plateau, their rate of movement will be accelerated and the particles will separate and spread over the plateau thereby facilitating the washing away of particles of gangue by the water directed onto the plateau by the launder 10.

Figure 9:
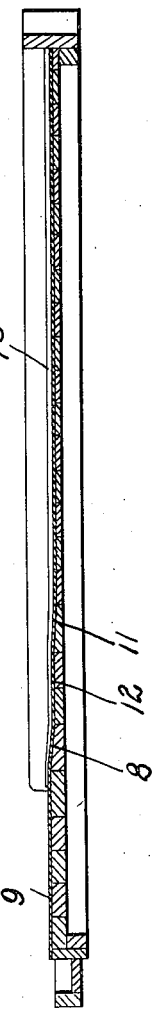

In lieu of employing a single inclined surface and plateau for raising the values out of the gangue, such upward movement of the values may be step by step, i. e., the values may be raised a certain distance through the gangue by an incline 11 onto a second stratifying surface formed by a plateau 12, and moved entirely out of the gangue onto the washing plateau 9 by the incline 8, as shown in Figs. 8 and 9. As in the construction shown in Fig. 1 and Fig. 2, the plateau 9 is so constructed that its surface is level with or slightly higher than the surface of the material on the table, while the plateau 12 is made of less height and will be below the level of the material on the table, and will serve as an auxiliary stratifying surface.

The main stratifying surfaces are provided with riffles 13 arranged parallel with the direction of the vibration of the table and therefore at right angles or approximately to the direction of flow of material across the stratifying surfaces. It is generally preferable to extend the riffles at least to the plateau which forms the washing surface, or if the ore is highly mineralized the riffles may extend across the washing plateau, such extensions being made very shallow, as for example in the matter indicated in Figs. 16 to 19.

It will be observed that the portion 2 of the table forms a pool in which the material has a slow movement, and consequently not only will the coarser particles move down onto the surface quite rapidly, but the finer particles will settle out of the upper portions of the material and down to such a level as to be readily caught by the riffles on the portion 4. Hence, although the inclination of the portion 4 is greater, only the surface portions of the material out of which values have settled, will have an increased rate of flow, due to the greater inclination, the under portions of the material containing the values being retarded by the riffles.

By reason of the comparatively rapid flow of the surface portions of the materials across the portion 4, and its lower specific gravity, due to elimination of the values in the pool, the vibratory motion of the table will have comparatively little effect thereon, and only a relatively small proportion of gangue will be moved to the line where the first upward movement of the values begins, and the values moving onto the first plateau will be comparatively free from gangue.

Figure 12:
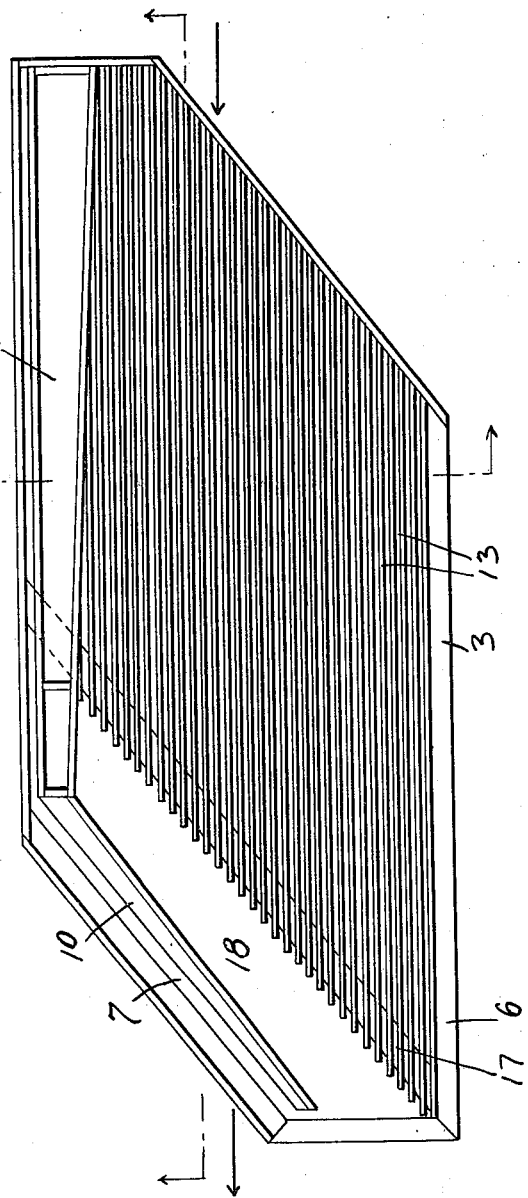
Figure 13:
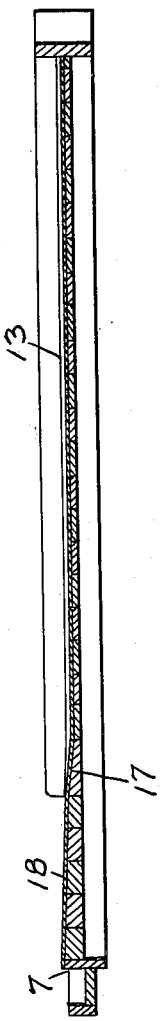

In lieu of employing a single incline and plateau, as in Figs. 1 and 2, or of raising the values to the washing surface by two inclines and an intermediate plateau, the upward movement may be effected by two inclined surfaces 14 and 15, onto a slightly inclined washing surface 16 which extends to the mineral discharge edge as shown in Figs. 10 and 11. In Figs. 12 and 13 is shown a further modification of the values lifting means, the first upward movement of the values being effected by a short incline 17 which delivers the values onto a surface 18 having a smaller upward inclination than the incline 17 and adapted to form a washing surface extending to the mineral discharge edge.

Figure 14:
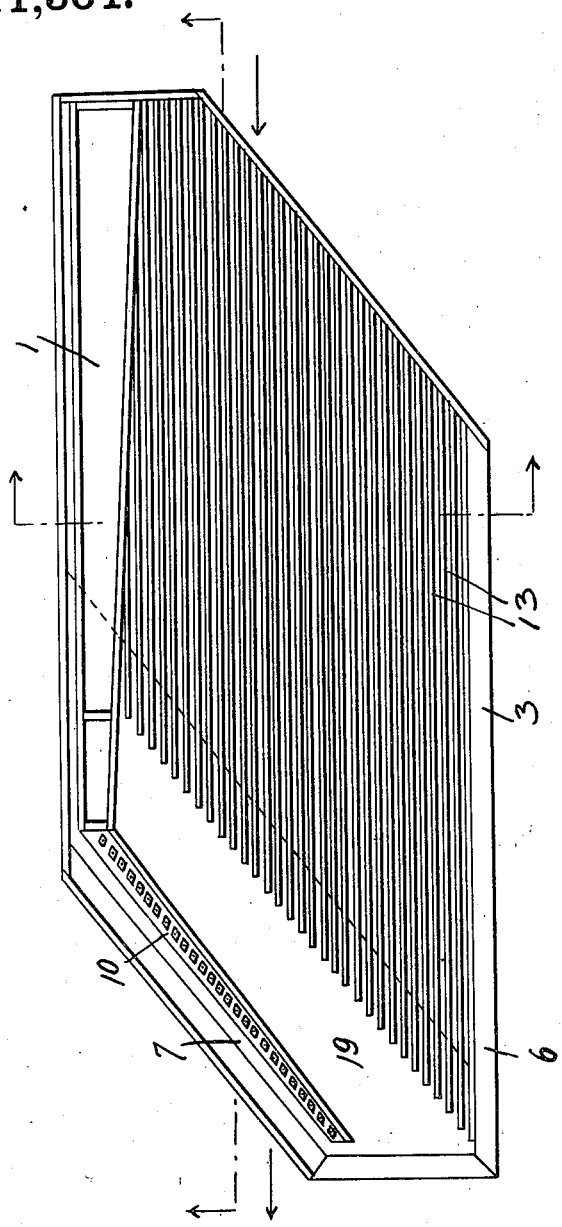
Figure 15:

In Figs. 14 and 15, the surface 19 for raising the values above the gangue is extended with a uniform inclination to the mineral discharge edge. As the washing water is directed onto the table adjacent to the mineral discharge edge, the washing water will flow opposite the direction of the movement of the values, and hence in the construction shown in Figs. 10 to 15 having backwardly inclined washing surfaces, care should be taken not to make the incline of so steep a pitch that the back flow of the water will prevent the onward movement of the values.

When treating ores rich in minerals, it is preferred to employ V-shaped riffles 13$^a$, as shown in Figs. 16, 17, 18 and 19, and to extend the riffles onto the washing up surface and preferably to the mineral discharge edge. As shown in Fig. 17, the riffles are so made that the apices of the portions on the main stratifying portions will be slightly above the surface of the washing up portion of the table, but as the portions of the riffles extending across the washing up portion should project above the surface of the latter, substantially less than the height of the apices of ribs on the main portion of the table above the surface of the latter, the tops of the ribs on the washing up surface are planed off as shown in Fig. 19. As for example, if the plateau forming the washing up surface in the form shown in Figs. 16 and 17, has its surface one-eighth of an inch above the main stratifying surface, the riffles overlying the latter surface would preferably be made a quarter of an inch in height, and the portions of the riffles overlying the plateau, so that their upper edges will be in a plane coincident with the apices of the riffles on the main stratifying surface, and hence will have a height of one-eighth of an inch above the surface of the plateau.

I claim herein as my invention:

1. A concentrating table having a portion of its surface extending from the line of feed approximately horizontal and the succeeding portion extending toward the tailings discharge edge having a downward inclination relative to the first portion in combination with riffles arranged substantially parallel with the direction of vibration of the table and means arranged transversely of the riffles for causing the values to move upwardly with reference to the material on the main stratifying surface.

2. A concentrating table having portions of its surface intermediate the line of feed and the tailings discharge edge at different inclinations relative to a horizontal plane, the portion adjacent to the line of feed having less inclination than the portion adjacent to the tailings discharge edge in combination with riffles arranged substantially parallel with the direction of vibration of the table and an upwardly inclined surface arranged transversely of the riffles in the rear of the mineral discharge edge.

3. A transversely inclined concentrating table having portions of its surface intermediate the line of feed and the tailings discharge edge at different inclinations relative to a horizontal plane, the portion adjacent to the line of feed having less inclination than the remaining portion of the table, in combination with riffles arranged substantially parallel with the direction of vibration of the table, a portion raised above the stratifying surface, the front edge of such portion forming the mineral discharge, and its rear edge being downwardly inclined to the main stratifying surface.

4. A transversely inclined concentrating table, having portions of its surface, intermediate the line of feed and the tailings discharge edge, at different inclinations, relative to a horizontal plane, the portion adjacent to the line of feed having less inclination than the portion adjacent to the tailings discharge edge, in combination with an upwardly inclined surface arranged along a diagonal line relative to the line of movement of the table, said inclined surface extending along the mineral discharge edge of the table, and riffles arranged on the table and extending toward the mineral discharge edge.

5. A differentially vibrated, transversely inclined concentrating table, having portions of the surface, intermediate the line of feed and the tailings discharge edge, at different inclinations relative to a horizontal plane, than the portion adjacent to the tailings discharge edge, the inclination from the feed side to the tailings discharge side successively increasing, in combination with an upwardly inclined portion arranged along a diagonal line relative to the line of movement of the table, said inclined surface extending along the mineral discharge edge of the table, and riffles arranged on the table and extending toward the mineral discharge edge.

6. A transversely inclined concentrating table, having portions of its surface, intermediate the line of feed and the tailings discharge edge, at different inclinations, the portion adjacent to the line of feed having less inclination than the portion adjacent to the tailings discharge edge, in combination with an upwardly inclined surface arranged along a diagonal line relative to the line of movement of the table, said inclined surface being co-extensive with the mineral discharge edge of the table, and riffles arranged on the main or stratifying surface, and terminating along the diagonal line of separation of mineral and gangue.

7. A transversely inclined concentrating table, having portions of its surface, intermediate the line of feed and the tailings discharge edge, at different inclinations relative to a horizontal plane the portion adjacent to the line of feed having less inclination than the portion adjacent to the tailings discharge edge, in combination with a plateau having an inclined approach, said inclined approach being arranged along a diagonal line relative to the line of movement of the table, the plateau extending along the mineral discharge edge and riffles arranged on the table and extending toward the mineral discharge edge.

8. A transversely inclined concentrating table, having portions of its surface, intermediate the line of feed and the tailings discharge edge, at different inclinations relative to a horizontal plane, the portion adjacent to the line of feed having less inclination than the portion adjacent to the tailings discharge edge, in combination with a plurality of plateaus each having an inclined approach, said inclined approaches being arranged along diagonal lines relative to the line of movement of the table, the upper plateau extending to the mineral discharge edge, and riffles arranged on the table extending toward the mineral discharge edge.

9. A transversely inclined concentrating table, having portions of its surface intermediate the line of feed and the tailings discharge edge at an angle the one to the other, the downward inclination of each portion being greater than that of the preceding portion, in combination with a plateau having an inclined approach, said inclined approach being arranged along a diagonal line relative to the line of movement of the table, the plateau extending along the mineral discharge edge, and riffles arranged on the table and extending toward the mineral discharge edge.

10. A transversely inclined concentrating table, having portions of its surface, intermediate the line of feed and the tailings discharge edge at an angle the one to the other, the downward inclination of each portion being greater than that of the preceding portion, in combination with a plurality of plateaus each having an inclined approach, said inclined approaches being arranged along diagonal lines relative to the line of movement of the table, the upper plateau extending toward the mineral discharge edge, and riffles arranged on the table and extending toward the mineral discharge edge.

11. A concentrating table having portions of its surface, intermediate the line of feed and the tailings discharge edge at an angle the one to the other, the downward inclination of each portion being greater than that of the preceding portion, in combination with a plateau having an inclined approach arranged along the mineral discharge edge.

12. A concentrating table having the portion of its surface adjacent to the line of feed approximately horizontal and the remaining portion extending to the tailings discharge edge having a downward inclination relative to the first portion, in combination with a plateau having an inclined approach arranged along the mineral discharge edge, transverse of the lines of movement of the values toward the mineral discharge edge, and riffles arranged on the main or stratifying surfaces and extending toward the mineral discharge edge.

In testimony whereof I have hereunto set my hand.

EMIL DEISTER.

Witness:
   ELIZABETH E. MOORHEAD.